US010855139B2

(12) United States Patent
Dubois et al.

(10) Patent No.: US 10,855,139 B2
(45) Date of Patent: Dec. 1, 2020

(54) ELECTRIC MOTOR COMPRISING AN ACOUSTIC ATTENUATION DEVICE

(71) Applicant: ALSTOM Transport Technologies, Saint-Ouen (FR)

(72) Inventors: Philippe Dubois, Trepot (FR); Thomas Mas, Pantin (FR); Andry-Mamy Randria, Besancon (FR); Michel Scherer, Grandfontaine (FR); Jean-Pierre Lombard, Miserey-Salines (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 235 days.

(21) Appl. No.: 15/673,887

(22) Filed: Aug. 10, 2017

(65) Prior Publication Data
US 2018/0048211 A1 Feb. 15, 2018

(30) Foreign Application Priority Data

Aug. 11, 2016 (FR) ...................... 16 57730

(51) Int. Cl.
*H02K 5/24* (2006.01)
*H02K 9/06* (2006.01)
*H02K 9/04* (2006.01)

(52) U.S. Cl.
CPC ................ *H02K 5/24* (2013.01); *H02K 9/04* (2013.01); *H02K 9/06* (2013.01)

(58) Field of Classification Search
CPC .. H02K 1/18; H02K 1/20; H02K 5/04; H02K 5/24; H02K 5/20; H02K 9/02; H02K 9/04; H02K 9/06; H02K 2209/00

USPC .... 310/51, 58, 59, 62–63, 65, 423, 429, 431
See application file for complete search history.

(56) References Cited

U.S. PATENT DOCUMENTS

| 2008/0048510 A1* | 2/2008 | Onodera | F01P 5/06 310/52 |
| 2010/0223751 A1 | 9/2010 | Liddell | |
| 2019/0027996 A1* | 1/2019 | Lang | H02K 9/06 |

FOREIGN PATENT DOCUMENTS

| CN | 201563022 U | 8/2010 |
| EP | 0105389 A2 | 4/1984 |
| EP | 0261295 A1 | 3/1988 |

(Continued)

OTHER PUBLICATIONS

Patent Translate Description EP0261295 p. 1-5 (Year: 2019).*

(Continued)

*Primary Examiner* — Nguyen Tran
(74) *Attorney, Agent, or Firm* — Pearne & Gordon LLP

(57) ABSTRACT

The electric motor includes a frame defining an inner volume (VI) wherein is accommodated a rotor, a stator and a fan, the frame comprising a first aperture placing the inner volume (VI) of the frame in fluidic communication with the outside of the frame, a second aperture placing the internal volume (VI) of the frame in fluidic communication with the outside of the frame along a radial axis (R) substantially perpendicular to an axis of rotation (X) of the rotor. The fan being positioned in proximity to the second aperture and being configured for generating a gas fluid flow (F), at least one acoustic attenuation device is accommodated in the second aperture so as to partly close the second aperture.

20 Claims, 2 Drawing Sheets

(56) References Cited

FOREIGN PATENT DOCUMENTS

JP     S50121903 U    10/1975
WO     0111206 A2    2/2001

OTHER PUBLICATIONS

French Search Report for FR1657730 dated Feb. 13, 2017.
EP Communication About Intention to Grant 71(3) CBE, for EP3282562, dated May 25, 2020.

* cited by examiner

ELECTRIC MOTOR COMPRISING AN ACOUSTIC ATTENUATION DEVICE

This application claims priority from French Patent Application No. 16 57730 filed on Aug. 11, 2016. The content of this application is incorporated herein by reference in its entirety.

BACKGROUND

The present invention relates to an electric traction motor for a railway vehicle, comprising an acoustic attenuation device.

The optimization of electric motors leads to always more compact electric motors and requiring efficient cooling.

The cooling is notably achieved by an internal or external fan to the electric motor laid out for injecting the cooling air into the motor in order to cool the stator and/or the rotor of the motor. In order to increase the efficiency of the cooling, it is possible to increase the size and/or the flow rate of the fan.

However, increasing the size and/or the flow rate of the fan increases the sound noise level emitted by the electric motor when this level has to be less than a predefined threshold noise level, in order to satisfy regulations imposed by the legislation of the country in which the electric motor is used.

For this reason, the use of an acoustic attenuation device is known giving the possibility of efficiently decreasing the emitted sound noise level by the electric motor.

Such electric motors comprising an acoustic attenuation device are for example described in documents U.S. Pat. Nos. 5,124,600 and 4,150,313.

However, the architecture of such electric motors does not give entire satisfaction. Indeed, these motors are bulky and their acoustic attenuation device makes regular maintenance of the electric motors complicated.

One of the objects of the invention is to propose an electric motor comprising an acoustic attenuation device, not being very bulky and allowing easy regular maintenance.

For this purpose, the object of the invention is an electric motor, comprising
    a frame defining an internal volume in which is accommodated a rotor, a stator and a fan, the frame comprising
        a first aperture placing the inner volume of the frame in fluidic communication with the outside of the frame,
        a second aperture placing the inner volume of the frame in fluidic communication with the outside of the frame along a radial axis substantially perpendicular to the axis of rotation of the rotor,
    the fan being positioned in vicinity of the second aperture and being configured for generating a flow of a gas fluid,
    wherein at least one acoustic attenuation device is accommodated in the second aperture so as to partly close the second aperture.

The advantages of such an electric motor are multiple and are summarized in a non-exhaustive way below.

The acoustic attenuation device accommodated in the second aperture of the frame of the electric motor gives the possibility of substantially keeping the initial bulk of the electric motor. Thus, the size of the electric motor is not increased by the presence of the attenuation device.

By partly closing the second aperture, it is possible to regulate the sound noise leaving the electric motor at a predefined level.

Advantageously, the electric motor according to the invention may comprise one or several of the following features, taken alone or according to all the technically conceivable combinations:
    the fan is a centrifugal fan;
    the second aperture comprises at least one first passage and a second passage for the passage of the gas fluid, the first passage being closed by the acoustic attenuation device;
    the acoustic attenuation device has a multilayer structure comprising a substantially soundless bottom layer, at least one cavity layer applied on the bottom layer and a sound passage layer applied on the cavity layer;
    the cavity layer is formed by at least one cylinder with a hexagonal base extending over a predefined distance between the bottom layer and the sound passage layer;
    the multilayer structure comprises several superposed cavity layers;
    the bottom layer is formed with a closed metal sheet;
    the sound passage layer is formed with a metal sheet including micro-holes;
    the acoustic attenuation device is secured to a casing, the casing being mounted on the frame so that the sound passage layer is oriented towards the fan; and
    the casing is formed with at least two parts configured for partly covering the second aperture.

The invention will be better understood upon reading the description which follows, exclusively given as an example and made with reference to the drawings wherein.

Figure 1:
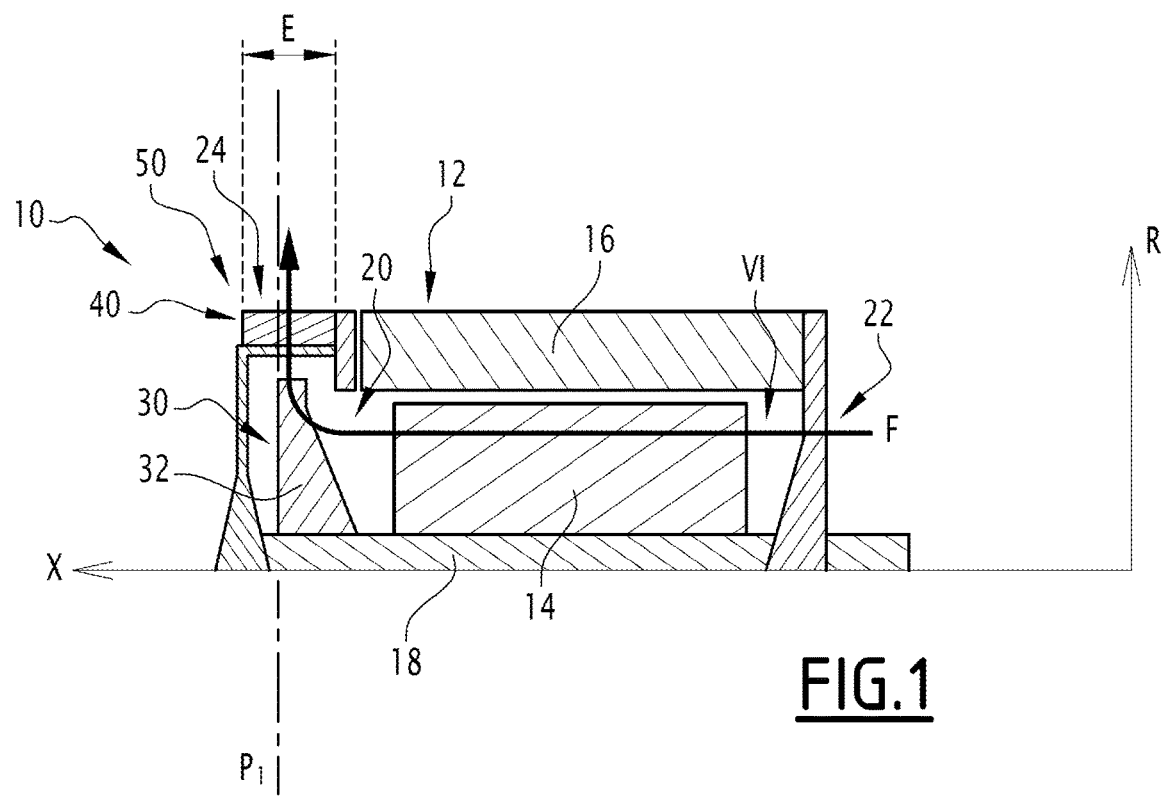
FIG. 1 is a partial sectional view along the axis of rotation X of the rotor of an electric motor according to the invention.
Figure 2:
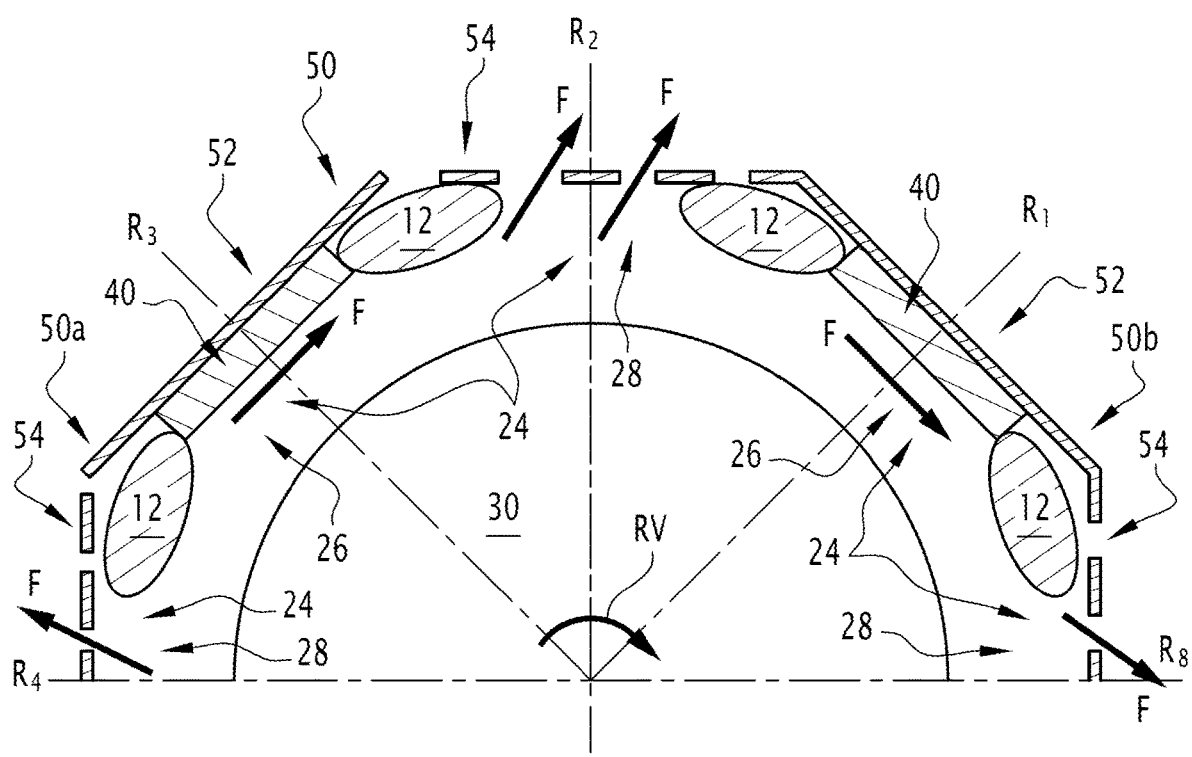
FIG. 2 is a partial sectional view along a plane P1 perpendicular to the axis of rotation X of the rotor of the electric motor of FIG. 1.

In FIGS. 1 and 2, an electric motor 10 according to a first embodiment of the invention is illustrated. The electric motor 10 comprises a frame 12 defining an inner volume VI in which is accommodated a rotor 14 and a stator 16. The rotor 14 is mounted secured in rotation on a rotary shaft 18 inside the frame 12 and mounted so as to be rotatably mobile around an axis of rotation X relatively to the stator 16 and to the frame 12. The stator 16 surrounds the rotor 14 and is coaxial with the latter inside the frame 12. Conventionally, the rotor 14 and the stator 16 give the possibility of converting an electric energy into a mechanical energy issued by the shaft 18 of the rotor 14. The operation of such a motor is known and will not be described in more detail here.

According to an embodiment, the frame 12 comprises a first aperture 22 placing the inner volume VI of the frame 12 in fluidic communication with the outside of the frame 12. The first aperture 22 is for example oriented along an axis substantially parallel with the axis of rotation X.

The frame 12 comprises a second aperture 24 placing the inner volume VI of the frame 12 in fluidic communication with the outside of the frame 12 along a radial axis R substantially perpendicular to the axis of rotation X.

The frame 12 comprises a cooling circuit 20 giving the possibility of guiding an external gas fluid flow F, for example ambient air, from the first aperture 22 to the second aperture 24.

More specifically, the cooling circuit 20, schematically illustrated in FIG. 1, is laid out so that the external gas fluid from the outside of the frame 12 enters the first aperture 22. The external gas fluid is guided by the cooling circuit 20 through the inner volume VI of the frame 12 for example cooling the stator 16 while having the cooling circuit 20 pass through and/or around the stator 16. The second aperture 24 finally gives the possibility of discharging the heated-up external gas fluid towards the outside of the frame 12. Thus, the frame 12 and the stator 16 are efficiently cooled by the ambient air stemming from the environment of the motor 10.

The second aperture 24 comprises an acoustic attenuation device 40 for attenuating a sound noise. The acoustic attenuation device 40 will be described in more detail subsequently.

The second aperture 24 is covered by a casing 50 for maintaining in place the acoustic attenuation device 40 in the second aperture 24. The casing 50 will be described in more detail subsequently.

The second aperture 24 comprises at least one first passage 26 and a second passage 28.

The first passage 26 extends along a first radial axis R1. By radial, is meant an axis extending in a plane substantially perpendicular to the axis of rotation X. The first passage 26 allows the passing of the gas fluid flow F between the inner volume VI of the frame 12 and the outside of the frame 12. According to an embodiment, the first passage 26 is closed by the acoustic attenuation device 40.

The second passage 28 extends along a second radial axis R2 different from the first radial axis R1. The second passage 28 also allows passing of the gas fluid flow F between the inner volume VI of the frame 12 and the outside of the frame 12.

In the case when the second aperture 24 comprises more than two first passages 26 and/or more than two second passages 28, each passage extends along a different radial axis.

Such an example comprising as a whole eight first passages 26 and second passages 28 with respective radial axes R1 to R8 is shown in FIG. 2 in a sectional view along a plane P1 perpendicular to the axis of rotation X of the rotor.

In the present description, the terms of «upstream» and «downstream» are defined relatively to the direction of circulation of a gas fluid flow F in the electric motor 10.

The shaft 18 of the rotor 14 is equipped with a fan 30 comprising at least one blade 32 able to generate the gas fluid flow F in the cooling circuit 20 inside the frame 12. In other words, the fan 30 is laid out for promoting the circulation of the gas fluid in the cooling circuit 20.

The fan 30 is positioned in the vicinity of the second aperture 24.

The fan 30 is movable in rotation along a direction of rotation RV. The direction of rotation RV influences the direction of the gas fluid flow F circulating in the periphery of the motor 10 between the frame 12 and the casing 50. If the direction of rotation RV is reversed, the direction of the gas fluid flow F is also reversed. That is to say that, when the direction of rotation RV of the fan 30 is in the clockwise direction, as this is shown in FIG. 2, the flow F substantially circulates in the clockwise direction in the periphery of the motor 10 between the frame 12 and the casing 50 and vice versa.

The direction of the gas fluid flow F in the inner volume VI is independent of the rotation of the fan 30. That is to say that the external gas fluid from the outside of the frame 12 enters the first aperture 22 and is discharged by the second aperture 24.

The example illustrated in FIG. 2 shows a fan 30 for which the rotation RV is accomplished in the clockwise direction and a gas fluid flow F with an orientation substantially perpendicular to the axis of rotation X of the fan 30.

The blade(s) 32 of the fan 30 is(are) for example located upstream from the second aperture 24. Thus, a gas flow is generated inside the frame 12 by the suction of a gas fluid from the outside of the motor through the first aperture 22 and by expulsion of this gas fluid by the second aperture 24.

The fan 30 is for example a centrifugal fan accommodated in the inner volume of the frame 12 of the motor 10. The use of a centrifugal fan internal to the frame 12 gives the possibility of minimizing the size of the electric motor 10 relatively to the use of an external fan.

The electric motor 10 further comprises the acoustic attenuation device 40 positioned in the vicinity of the fan 30.

The acoustic attenuation device 40 is accommodated in the second aperture 24. Thus, the acoustic attenuation device 40 partly closes the second aperture 24.

The acoustic attenuation device 40 may be accommodated in the first passage 26 for completely closing this first passage 26.

In this case, the second passage 28 is not closed by the acoustic attenuation device 40, as shown in the example in FIG. 2.

Figure 3:
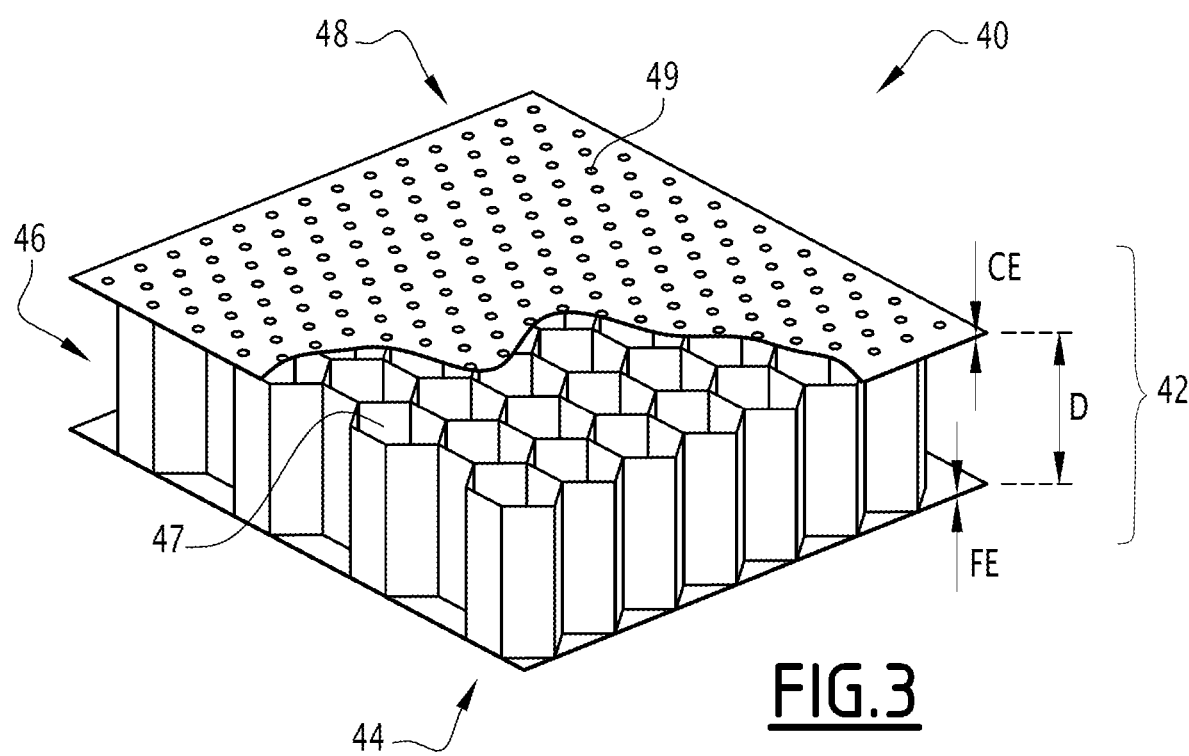
FIG. 3 is a schematic perspective illustration of an acoustic attenuation device of FIG. 1.

The acoustic attenuation device 40 is showed in detail in FIG. 3 and comprises at least a multilayer structure 42 comprising a substantially soundless bottom layer 44. The bottom layer 44 is for example formed with a metal sheet, for example in stainless steel. The bottom layer 44 for example has a thickness FE substantially comprised between 0.5 mm and 5 mm.

The multilayer structure 42 comprises at least one cavity layer 46 which is applied on the bottom layer 44. The cavity layer 46 is for example formed with at least one cylinder 47.

The base of the cylinder 47 is in contact with the bottom layer 44. The cylinder 47 for example has a hexagonal base. The cylinder 47 may be made in metal.

The cylinder 47 extends along an axis extending perpendicularly to a plane defined by the bottom layer 44.

The cylinder 47 extends over a predefined distance D, measured along the axis of the cylinder, between the bottom layer 44 and a sound passage layer 48.

The predefined distance D is for example comprised between 5 mm and 100 mm.

According to an embodiment illustrated in FIG. 3, the cavity layer 46 is formed with several adjacent cylinders 47 in order to form a cavity layer as a honeycomb.

The sound passage layer 48 is applied on the cavity layer 46 and comprises micro-holes 49. The micro-holes 49 for example have a diameter comprised between 0.5 mm and 5 mm.

The sound passage layer 48 is parallel to the bottom layer 44.

The sound passage layer 48 is for example formed with a stainless steel sheet. The sound passage layer 48 has a thickness CE for example comprised between 0.5 mm and 5 mm.

The sound passage layer 48 allows the passing of the gas fluid flow F through micros-holes 49 inside at least one cylinder of the cavity layer.

Advantageously, the acoustic attenuation device 40 is oriented so that the gas fluid flow F encounters the sound passage layer 48. According to an embodiment, the sound passage layer 48 is oriented towards the fan 30, while the bottom layer 44 is oriented towards the outside of the motor.

When the gas fluid flow F is flushed with or penetrates the sound passage layer 48, the sound waves emitted by the gas fluid flow F passed through the micros-holes 49 of the sound passage layer 48 so as to penetrate inside the cavity layer 46.

Inside the cavity layer 46, the sound waves are guided by walls of the cylinder 47 and are reflected by the bottom layer 44, and the interaction between guided and reflected waves generates an attenuation according to the Helmholtz principle.

This multilayer structure 42 corresponds to a sandwich of the Helmholtz type.

Thus, the sound noise produced by the rotor 14, the fan 30 and by the magnetic field generated during the interaction of the rotor 14 and of the stator 16 may be attenuated by the acoustic attenuation device 40 in an efficient way.

The sound noise attenuation of the acoustic attenuation device 40 is of the order of 2 to 5 dB.

The possible attenuation of the acoustic frequencies of the sound noise is mainly comprised between 0 and 2 kHz.

The cavity layer gives the possibility of attenuating a predefined acoustic frequency. The predefined acoustic frequency may be selected beforehand depending on the predefined distance D between the bottom layer and the sound passage layer 48.

Alternatively, the acoustic frequency to be attenuated may be selected according to the diameter of the micros holes 49, and/or according to the thickness CE of the sound passage layer 48.

Thus, the sound noise generated inside the electric motor 10 passing through the second aperture 24 is attenuated in an efficient way.

The casing 50 is attached by means of screws (not shown) to the frame 12. Thus, the casing 50 may easily be disassembled and mounted during maintenance of the electric motor 10.

The casing 50 comprises at least one soundless area 52 and at least one area for letting through air 54.

The soundless area 52 of the casing 50 is placed facing the first passage 26 when the casing 50 is attached to the frame 12. The soundless area 52 does not allow the passing of a gas fluid flow F.

The soundless area 52 extends in a plane parallel to the axis of rotation X. The soundless area 52 is for example formed with a stainless steel sheet or of another metal protected against corrosion.

The soundless area 52 of the casing 50 bears the acoustic attenuation device 40. Thus, the acoustic attenuation device 40 is maintained in place in the first passage 26 of the second aperture 24.

The area for passing of the air 54 is placed facing the second passage 28 when the casing 50 is attached to the frame 12. The area for letting through air 54 extends in a plane parallel to the axis of rotation X. The area for letting through air 54 is for example formed with a metal sheet including holes.

The holes of the area for letting through air 54 allow the gas fluid flow F to cross the area for letting through air 54 of the casing 50. In other words, the gas fluid flow F from the inner volume VI of the frame 12 may pass through the second passage 28 of the second aperture 24 and the area for letting through air 54 of the casing 50 towards the outside of the electric motor 10.

The casing 50 is formed in at least two parts 50a and 50b laid out so as to partly cover the second aperture 24.

The first part 50a and the second part 50b may be disassembled from the frame 12 independently of each other. This allows partial disassembly of the casing 50 in order to access the inside the frame 12 through the second aperture 24 during maintenance of the electric motor 10. Thus, maintenance of the electric motor 10 becomes easier as compared with maintenance requiring a complete disassembling of the casing 50 for accessing the inside of the frame 12.

The casing 50 extends in a direction parallel to the axis of rotation X over a distance of thickness E comprised for example between 20 and 200 mm.

Advantageously, the casing 50 does not exceed the radial dimensions of the frame 12 of the electric motor 10. Thus, the electric motor 10 keeps a compact size.

The total path of the gas fluid flow F is the following. The flow F of gas fluid is generated by the fan 30 which sucks up the gas fluid outside the frame 12 through the first aperture 22 in the inner volume VI of the frame 12. The flow F then passes through the cooling circuit 20 inside the frame 12. Next, the fan 30 expels the flow F through the second aperture 24. During this expulsion of the flow F, at least one portion of the flow F encounters the acoustic attenuation device 40 which blocks the first passage 26 of the second aperture 24. Finally, the flow F passes at least partly through the second passage 28 of the second aperture 24 and through the area for letting through air 54 of the casing 50 towards the outside of the electric motor.

In an embodiment including several first passages 26 and at least one second passage 28, it is possible to provide several first adjacent passages 26 in a radial sector defined between a first radial axis and a second radial axis different from the first radial axis. Thus, the sound noise emitted by the electric motor 10 in this radial sector is decreased.

In an alternative, the acoustic attenuation device 40 is accommodated in the second passage 28 and the first passage 26 is without any acoustic attenuation device 40.

In still another alternative, the acoustic attenuation device 40 is partly accommodated in the first passage 26 and partly in the second passage 28.

According to an alternative embodiment which may be combined with those described earlier, the multilayer structure 42 comprises several superposed cavity layers 46 including a perforated plate or a membrane between each cavity layer 46. In this case, it is possible to attenuate the noise in a range of frequencies.

It is possible to orient the first aperture 22 along a direction perpendicular to the axis of rotation X. In this case, it is possible to apply the teaching described earlier relative to the acoustic attenuation device at the first aperture 22.

What is claimed is:

1. An electric motor, comprising:
   a frame defining an inner volume wherein is accommodated a rotor, a stator and a fan, the frame comprising:
   a first aperture placing the inner volume of the frame in fluidic communication with the outside of the frame, and
   a second aperture placing the inner volume of the frame in fluidic communication with the outside of the frame according to a radial axis perpendicular to an axis of rotation of the rotor,
   the fan being positioned in the vicinity of the second aperture and being configured for generating a gas fluid flow, wherein
   at least one acoustic attenuation device is accommodated in the second aperture so as to partly close the second aperture,
   the second aperture comprises at least one first passage and one second passage for letting through the gas fluid, the at least one acoustic attenuation device accommodated in and closing the first passage, the first passage and the second passage are defined at least partially by the frame and are adapted for the passage of the flow of the gas fluid between the inner volume of the frame and the outside of the frame, the first passage extends along a first radial axis, the second passage extends along a second radial axis different from the first radial axis, said first and second radial axis extend in a plane perpendicular to the rotation axis of the rotor, and the first passage and the second passage are circumferentially arranged around the rotation axis of the rotor, and the motor comprises a casing mounted to the frame, the casing comprising at least one soundless area arranged facing the first passage and not allowing the passing of the gas fluid, and at least one area arranged facing the second passage and allowing the gas fluid and the soundless area of the casing bearing the at least one acoustic attenuation device.

2. The electric motor according to claim 1, wherein the fan is a centrifugal fan.

3. The electric motor according to claim 1, wherein the acoustic attenuation device has a multilayer structure comprising a soundless bottom layer, at least one cavity layer applied on the bottom layer, and a sound passage layer applied on the cavity layer.

4. The electric motor according to claim 3, wherein the cavity layer is formed with at least one cylinder with a hexagonal base extending over a predefined distance between the bottom layer and the sound passage layer.

5. The electric motor according to claim 3, wherein the multilayer structure comprises several superimposed cavity layers.

6. The electric motor according to claim 3, wherein the first sound passage layer is formed by a metal sheet including micro-holes.

7. The electric motor according to claim 3, wherein the bottom layer is formed by a closed metal sheet.

8. The electric motor according to claim 3, wherein the acoustic attenuation device is secured to the casing, the casing being mounted on the frame so that the sound passage layer—is oriented towards the fan.

9. The electric motor according to claim 8, wherein the casing is formed in at least two parts configured for partly covering the second aperture.

10. The electric motor according to claim 1, further comprising a plurality of additional first passages and a plurality of additional second passages, the first passage and the additional first passages providing a first passage group and the second passage and the additional second passages providing a second passage group, and wherein the passages of the first passage group and the passages of the second passage group are alternatively arranged around the rotation axis of the rotor.

11. The electric motor according to claim 1, wherein the first passage and the second passage are circumferentially spaced from one another about the rotation axis of the rotor.

12. The electric motor according to claim 1, wherein the first passage and the second passage are arranged circumferentially adjacent one another.

13. An electric motor, comprising:
a frame defining an inner space in which a rotor, a stator and a fan are housed, the frame comprising:
a first aperture placing the inner volume of the frame in fluid communication with an outside of the frame, and
a second aperture placing the inner volume of the frame in fluid communication with the outside of the frame along a radial axis perpendicular to a rotation axis of the rotor,
the fan being arranged in the vicinity of the second aperture and being configured for generating a flow of a gaseous fluid,
the second opening comprising at least one first passage and at least one second passage for the passage of the gaseous fluid, said at least one first passage and at least one second passage being through slots defined in the frame and arranged around the rotation axis of the rotor, and
the electric motor further comprising:
at least one acoustic attenuation device accommodated in the at least one first passage to close the first passage, at least one soundless area placed facing the first passage and not allowing the passing of the gas fluid flow, and at least one area for letting through air placed facing the second passage and allowing the passing of the gas fluid flow, the soundless area of the casing bearing the at least one acoustic attenuation device.

14. The electric motor according to claim 13, wherein the first passage and the second passage are defined at least partially by the frame.

15. The electric motor according to claim 13, further comprising a plurality of additional first passages and a plurality of additional second passages, the first passage and the additional first passages providing a first passage group and the second passage and the additional second passages providing a second passage group, and wherein the passages of the first passage group and the passages of the second passage group are alternatively arranged around the rotation axis of the rotor.

16. The electric motor according to claim 13, wherein the first passage and the second passage are adapted for the passage of the flow of the gas fluid between the inner space of the frame and the outside of the frame.

17. The electric motor according to claim 13, wherein the first passage and the second passage are circumferentially arranged about the rotation axis of the rotor.

18. The electric motor according to claim 13, wherein the first passage and the second passage are circumferentially spaced from one another about the rotation axis of the rotor.

19. The electric motor according to claim 13, wherein the first passage extends along a first radial axis, and the second passage extends along a second radial axis different from the first radial axis, and wherein said first and second radial axes extend in a plane perpendicular to the rotation axis of the rotor.

20. The electric motor according to claim 13, wherein the acoustic attenuation device has a multilayer structure comprising a bottom layer soundless, at least one cavity layer applied on the bottom layer and a sound passage layer applied on the cavity layer.

* * * * *